(12) United States Patent
Liu et al.

(10) Patent No.: US 10,299,246 B2
(45) Date of Patent: May 21, 2019

(54) MESSAGE PUSHING METHOD, CLIENT, SERVER AND PROGRAMMABLE DEVICE

(71) Applicant: GUANGZHOU UCWEB COMPUTER TECHNOLOGY CO., LTD., Guangzhou (CN)

(72) Inventors: Zhipeng Liu, Guangzhou (CN); Aiqiang Fang, Guangzhou (CN)

(73) Assignee: Guangzhou UCWeb Computer Technology Co., Ltd., Guangzhou (CN)

( * ) Notice: Subject to any disclaimer, the term of this patent is extended or adjusted under 35 U.S.C. 154(b) by 0 days.

(21) Appl. No.: 15/831,531

(22) Filed: Dec. 5, 2017

(65) Prior Publication Data

US 2018/0160396 A1    Jun. 7, 2018

(30) Foreign Application Priority Data

Dec. 6, 2016   (CN) .......................... 2016 1 1109805

(51) Int. Cl.
| | | |
|---|---|---|
| *H04W 4/12* | (2009.01) | |
| *H04L 12/26* | (2006.01) | |
| *H04L 29/08* | (2006.01) | |
| *H04W 68/02* | (2009.01) | |

(52) U.S. Cl.
CPC ............ *H04W 68/02* (2013.01); *H04L 67/26* (2013.01); *H04L 67/34* (2013.01); *H04L 43/0817* (2013.01); *H04L 67/303* (2013.01); *H04W 4/12* (2013.01)

(58) Field of Classification Search
CPC ....... H04L 67/1046; H04L 67/34; H04W 4/08
See application file for complete search history.

(56) References Cited

U.S. PATENT DOCUMENTS

| | | | |
|---|---|---|---|
| 6,535,855 B1 | 3/2003 | Cahill et al. | |
| 2012/0265546 A1* | 10/2012 | Hwang | ............... G06F 19/3456 705/2 |
| 2012/0265548 A1* | 10/2012 | Hwang | ............. G06Q 30/0207 705/2 |
| 2012/0265591 A1* | 10/2012 | Hwang | .................. G06Q 30/00 705/14.16 |
| 2013/0117382 A1 | 5/2013 | Gaddam et al. | |

FOREIGN PATENT DOCUMENTS

| | | |
|---|---|---|
| CN | 102892089 A | 1/2013 |
| RU | 119197 U1 | 8/2012 |

OTHER PUBLICATIONS

Official Action dated Dec. 13, 2018, issued in related Russian Application No. 2017142357 (8 pages).
Search Report dated Nov. 26, 2018, issued in related Russian Application No. 2017142357 (2 pages).

* cited by examiner

*Primary Examiner* — Diane D Mizrahi
(74) *Attorney, Agent, or Firm* — Sheppard Mullin Richter & Hampton LLP (57) ABSTRACT

The present invention discloses a message pushing method, client, server, and programmable device. The method comprises: sending a message list request to a server, and acquiring a target message list correspondingly returned by the server; when the local status is monitored as meeting a pushing trigger condition for a target message, generating, according to the target message, a message display interface that fits the local application environment for pushing the target message. According to the present invention, the timing to push messages is more accurate and the message display efficiency is improved.

18 Claims, 5 Drawing Sheets

MESSAGE PUSHING METHOD, CLIENT, SERVER AND PROGRAMMABLE DEVICE

TECHNICAL FIELD

The present invention relates to the field of message pushing technologies, and in particular, to a message pushing method, client, server, and programmable device.

BACKGROUND

Along with the development of mobile Internet technologies and widespread intelligent electronic devices, users can use a variety of Internet technology-based application programs (e.g. various cell phone applications, cell phone games, etc.) on electronic devices, such as cell phones, tablet computers, and handheld computers, greatly enriching the user experience. Here, by periodically and promptly pushing messages that might be of interest to a user or are desired to be promoted to electronic devices for display to the user, the use experience of the user can be further improved and the stickiness of a user to an application program is enhanced.

However, most of the past message pushing technologies perform message pushing by predicting a user's behaviors through the user's historical behavior data and clustering target pushing objects. As a result, the range of message pushing objects is too broad, as there are usually errors in prediction of pushing objects. Moreover, it is impossible to push messages for actual application scenarios of a pushing object, the timing of message pushing is often inappropriate, and the message display efficiency is low.

Therefore, the inventor believes that it is necessary to address the above problems in the prior art.

SUMMARY

One object of the present invention is to provide a new technical solution for message pushing.

According to a first aspect of the present invention, a message pushing method is provided, which comprises:

sending a message list request to a server, and acquiring a target message list correspondingly returned by the server, wherein the message list request at least comprises request source information, the target message list comprises at least one target message to be pushed and a corresponding message pushing trigger condition, and the message pushing trigger condition is a corresponding local status index when the target message is triggered for pushing;

when the local status is monitored as meeting a pushing trigger condition for the target message, generating, according to the target message, a message display interface that fits the local application environment for pushing the target message.

Optionally, the target message is used to recommend a corresponding target application, the local application environment comprises that the target application has not been downloaded, that the target application has been downloaded but not installed, that the version of the installed target application is not the latest version, and that the latest version of the target application has been installed, and the step of generating, according to the target message, a message display interface that fits the local application environment for pushing the target message comprises:

when the local application environment is that the target application has not been installed and has not been downloaded, generating the message display interface for a user to select to download the target application;

when the local application environment is that the target application has not been installed but has been downloaded, generating the message display interface for a user to select to install the target application;

when the local application environment is that the version of the installed target application is not the latest version, generating the message display interface for a user to select to upgrade the target application;

when the local application environment is that the latest version of the target application has been installed, generating the message display interface for a user to select to open the target application.

Optionally, the method further comprises:

executing, in response to a sending parameter setting request and according to the set sending parameter, the step of sending a message list request.

Optionally, the local status index at least comprises one of local device status indexes and local application environment indexes.

According to a second aspect of the present invention, a message pushing method is provided, which comprises:

in response to a received message list request from a client, determining a target message corresponding to request source information comprised in the message list request;

generating, according to the target message and a corresponding message pushing trigger condition, a corresponding target message list and returning the target message list to the client, wherein the target message list comprises at least one target message to be pushed and a corresponding message pushing trigger condition, and the message pushing trigger condition is a corresponding local status index of the client when the target message is triggered for pushing.

Optionally, the method further comprises:

in response to a message pushing setting request, setting the target message to be pushed and the corresponding message pushing trigger condition.

According to a third aspect of the present invention, a client is provided, which comprises:

a message list acquiring unit configured to send a message list request to a server and acquire a target message list correspondingly returned by the server, wherein the message list request at least comprises request source information, the target message list comprises at least one target message to be pushed and a corresponding message pushing trigger condition, and the message pushing trigger condition is a corresponding local status index when the target message is triggered for pushing;

a target message pushing unit configured to generate, when the local status is monitored as meeting a pushing trigger condition for the target message and according to the target message, a message display interface that fits the local application environment for pushing the target message.

Optionally, the target message is used to recommend a corresponding target application, the local application environment comprises that the target application has not been downloaded, that the target application has been downloaded but not installed, that the version of the installed target application is not the latest version, and that the latest version of the target application has been installed, and the target message pushing unit is further configured to:

generate, when the local application environment is that the target application has not been installed and has not been downloaded, the message display interface for a user to select to download the target application;

generate, when the local application environment is that the target application has not been installed but has been downloaded, the message display interface for a user to select to install the target application;

generate, when the local application environment is that the version of the installed target application is not the latest version, the message display interface for a user to select to upgrade the target application;

generate, when the local application environment is that the latest version of the target application has been installed, the message display interface for a user to select to open the target application.

Optionally, the client further comprises:

a sending parameter setting unit configured to trigger, in response to a sending parameter setting request and according to the set sending parameter, the message list acquiring unit to work.

According to a fourth aspect of the present invention, a server is provided, which comprises:

a request responding unit configured to determine, in response to a received message list request from a client, a target message corresponding to request source information comprised in the message list request;

a message list returning unit configured to generate, according to the target message and a corresponding message pushing trigger condition, a corresponding target message list and return it to the client, wherein the target message list comprises at least one target message to be pushed and a corresponding message pushing trigger condition, and the message pushing trigger condition is a corresponding local status index of the client when the target message is triggered for pushing.

Optionally, the server further comprises:

a message pushing setting unit configured to set, in response to a message pushing setting request, the target message to be pushed and the corresponding message pushing trigger condition.

A fifth aspect of the present invention comprises a memory and a processor, wherein the memory is configured to store an instruction, and the instruction is used to control the processor to operate to execute any message pushing method according to the first aspect of the present invention.

A sixth aspect of the present invention comprises a memory and a processor, wherein the memory is configured to store an instruction, and the instruction is used to control the processor to operate to execute any message pushing method according to the second aspect of the present invention.

The inventor of the present invention finds that the prior art does not have a message pushing method, client, server, and programmable device capable of pushing messages according to actual application scenarios of a pushing object, such that the timing to push messages is more accurate and at the same time, messages are pushed via a message display interface that fits the local application environment, thereby improving the message display efficiency. Therefore, the technical task to be achieved or the technical problem to be solved by the present invention has never been conceived or expected by those skilled in the art. As a result, the present invention is a new technical solution.

Other features and advantages of the present invention will become clear through the following detailed description of illustrative embodiments of the present invention with reference to the accompanying drawings.

BRIEF DESCRIPTION OF THE DRAWINGS

The accompanying drawings that are incorporated in the description and constitute a part of the description illustrate embodiments of the present invention, and are used, together with the description thereof, to explain the principle of the present invention.

DETAILED DESCRIPTION

Various illustrative embodiments of the present invention will be described in detail with reference to the accompanying drawings. It should be noted that relative arrangements of parts and steps, numeric expressions and numerals set forth in these embodiments do not limit the scope of the present invention, unless otherwise specifically described.

The following description of at least one illustrative embodiment is illustrative only and does not function as any limitation at all to the present invention and its application or use.

Technologies, methods and devices known to those skilled in the art may not be discussed in detail, but in a proper situation, these technologies, methods and devices shall be deemed as a part of the description.

In all examples illustrated and discussed herein, any specific value shall be construed as illustrative only, rather than limitative. Therefore, other examples of the illustrative embodiments may have different values.

It should be noted that similar numerals and letters represent similar items in the drawings below. Once an item is defined in one drawing, therefore, it does not need to be further discussed in the following drawings.

<Hardware Configuration>

Figure 1:
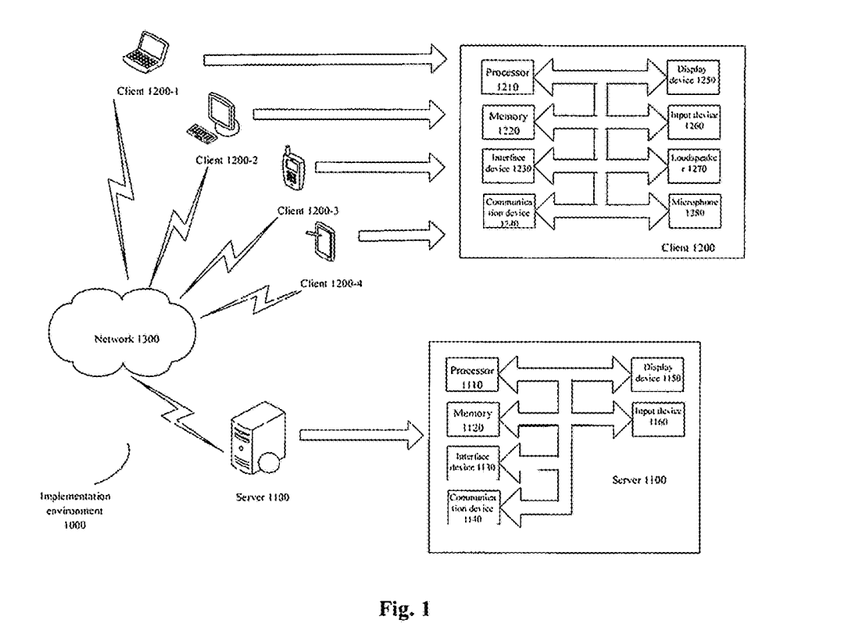
FIG. 1 is a block diagram of an example of hardware configuration of an implementation environment according to an embodiment of the present invention.

As shown in FIG. 1, the implementation environment 1000 comprises a server 1100, a client 1200, and a network 1300.

The server 1100 may be, for example, a blade server. In one example, the server 1100 may be a computer. In another example, the server 1100 may comprise, as shown in FIG. 1, a processor 1110, a memory 1120, an interface device 1130, a communication device 1140, a display device 1150, and an input device 1160. Although the server may also comprise a loudspeaker, a microphone, etc., these parts are irrelevant to the present invention and are therefore omitted herein. Here, the processor 1110 may be, for example, a Central Processing Unit (CPU), a microprocessor (MCU), etc. The memory 1120 comprises, for example, a ROM (Read-Only Memory), a RAM (Random Access Memory), a non-volatile memory such as hard drive, etc. The interface device 1130 comprises, for example, a USB interface, a serial interface, etc. The communication device 1140 can, for example, conduct wired or wireless communications. The display device 1150 is, for example, a liquid crystal display. The input device 1160 may comprise, for example, a touchscreen, a keyboard, etc.

The client 1200 may be, for example, a laptop computer (1200-1), a desktop computer (1200-2), a cell phone (1200-3), a tablet computer (1200-4), etc. As shown in FIG. 1, the client 1200 may comprise a processor 1210, a memory 1220, an interface device 1230, a communication device 1240, a display device 1250, an input device 1260, a loudspeaker 1270, a microphone 4080, etc. Here, the processor 1210 may be a Central Processing Unit (CPU), a microprocessor (MCU), etc. The memory 1220 comprises, for example, a ROM (Read-Only Memory), a RAM (Random Access Memory), a non-volatile memory such as hard drive, etc. The interface device 1230 comprises, for example, a USB interface, a headphone interface, etc. The communication device 1240 can, for example, conduct wired or wireless communications. The display device 1250 is, for example, a liquid crystal display, a touchscreen, etc. The input device 1260 may comprise, for example, a touchscreen, a keyboard, etc. A user may input/output voice information via the loudspeaker 1270 and the microphone 1280.

The communication network 1300 may be a wireless network or a wired network, either a local area network or a wide area network. In the configuration environment 1000 shown in FIG. 1, the clients 1200-1, 1200-2, 1200-3, and 1200-4 can communicate with the server 1100 via the communication network 1300.

The configuration environment 1000 shown in FIG. 1 is merely illustrative and is in no way intended to limit the present invention or its application or use. When applied in embodiments of the present invention, the memory 1120 of the server 1100 is configured to store an instruction, and the instruction is used to control the processor 1110 to operate to execute any message pushing method according to the embodiments of the present invention. In addition, the memory 1220 of the client 1200 is configured to store an instruction, and the instruction is used to control the processor 1210 to operate to execute any message pushing method according to the embodiments of the present invention. Those skilled in the art should understand that, although a plurality of devices are shown in FIG. 1 for both the server 1100 and the client 1200, the present invention may only involve some devices thereof. For example, the server 1100 involves only the processor 1110 and the memory 1120, or the client 1200 involves only the processor 1210 and the memory 1220. Technical staff can design an instruction according to the solution disclosed by the present invention. How an instruction controls a processor to operate is common general knowledge in the art, which will not be described in detail herein.

First Embodiment

Figure 2:
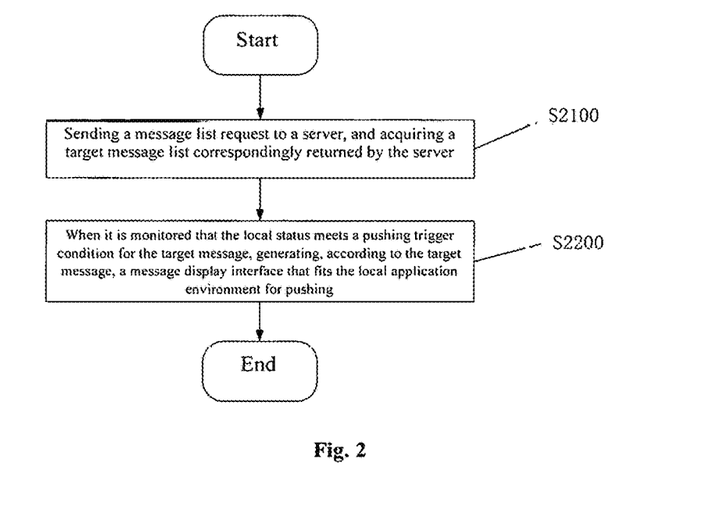
FIG. 2 is a flow chart of a message pushing method according to a first embodiment of the present invention.

A message pushing method is provided in the present embodiment, as shown in FIG. 2, comprising:

Step S2100. Sending a message list request to a server, and acquiring a target message list correspondingly returned by the server.

Here, the message list request at least comprises request source information. The request source information is the source information of the client that sends the message list request, e.g. source country, source channel (e.g. different flow channel or promotion channel), a version of the client and other information. The client may be an electronic device, such as a cell phone, a handheld computer, a tablet computer, etc., or may be an application program having some application functions and installed in an electronic device.

The target message list comprises at least one target message to be pushed and a corresponding message pushing trigger condition, and the message pushing trigger condition is a corresponding local status index when the target message is triggered for pushing.

Specifically, the local status index refers to an index when the local status of the client that sends the message list request meets the message trigger condition.

Here, the local status may be a local device status of the client, for example, a status of a local device, including the remaining power, storage capacity, CPU (Central Processing Unit) utilization rate, CPU temperature, RAM (Random Access Memory) utilization rate, number of installed applications, local time period, network connection type, charging status, and foreground process; the local status may also be a local application environment of the client, and the local application environment may be a local application environment corresponding to the content of the target message. For example, the target message is used to recommend a corresponding target application, and then the local application environment may comprise that the target application has not been downloaded, that the target application has been downloaded but not installed, that the version of the installed target application is not the latest version, and that the latest version of the target application has been installed.

Specifically, the local status index may therefore at least comprise one of local device status indexes and local application environment indexes.

The local device status index may be a status index of at least one status of the local device, including the remaining power, storage capacity, CPU (Central Processing Unit) utilization rate, CPU temperature, RAM (Random Access Memory) utilization rate, number of installed applications, local time period, network connection type, charging status, and foreground process; the local application environment index may be an local application environment corresponding to the content of the target message. For example, the target message is used to recommend a corresponding target application, and the application environment index may be that the target application has been installed or that the target application has not been installed.

With the step S2100, a message list request can be sent to a server to acquire a corresponding target message list. In a specific application, a sending parameter may be further set according to an application scenario or an application need, such that the step S2100 is executed according to the corresponding sending parameter.

The sending parameter may comprise a sending cycle of the message list request, and the occurring cycle can be set according to an engineering empirical value or an application need, such that the message list request would not be sent overly frequently to cause wastes of processing resources or overly infrequently to lead to incapability to adapt to updates of the message list. In one example, the sending cycle is 24 h. The sending parameter may further comprise a sending enable switching parameter. When the sending enable switching parameter is set to be closed, the execution of the step of sending a message list request to a server is stopped, and when the sending enable switching parameter is set to be open, the execution of the step of sending a message list request to a server is allowed.

Therefore, the message pushing method provided in the present embodiment may further comprise: executing, in response to a sending parameter setting request and according to the set sending parameter, the step of sending a message list request.

After the target message list is acquired through the step S2100, going to the step S2200. When it is monitored that the local status meets a pushing trigger condition for the target message, generating, according to the target message, a message display interface that fits the local application environment for pushing the target message.

In the present embodiment, after the target message list is acquired through the client, the target message list can be cached locally on the client, and then the local status of the client is monitored. When it is monitored that the local status meets a pushing trigger condition for the target message, i.e. the local status meets the corresponding local status index when the target message is triggered for pushing, a message display interface that fits the local application environment is generated according to the target message for pushing. Therefore, the pushing of a target message triggered according to the local status and the completion of pushing by generating a message display interface with reference to the local application environment achieve message pushing according to an actual application scenario of the pushing object, such that the timing to push messages is more accurate and at the same time, messages are pushed via a message display interface that fits the local application environment, thereby improving the message display efficiency.

Specifically, the target message may be used to recommend a corresponding target application, and correspondingly, the local application environment comprises that the target application has not been downloaded, that the target application has been downloaded but not installed, that the version of the installed target application is not the latest version, and that the latest version of the target application has been installed, and the step of generating, according to the target message, a message display interface that fits the local application environment for pushing the target message may comprise:

when the local application environment is that the target application has not been installed and has not been downloaded, generating the message display interface for a user to select to download the target application;

when the local application environment is that the target application has not been installed but has been downloaded, generating the message display interface for a user to select to install the target application;

when the local application environment is that the version of the installed target application is not the latest version, generating the message display interface for a user to select to upgrade the target application;

when the local application environment is that the latest version of the target application has been installed, generating the message display interface for a user to select to open the target application.

Figure 3:
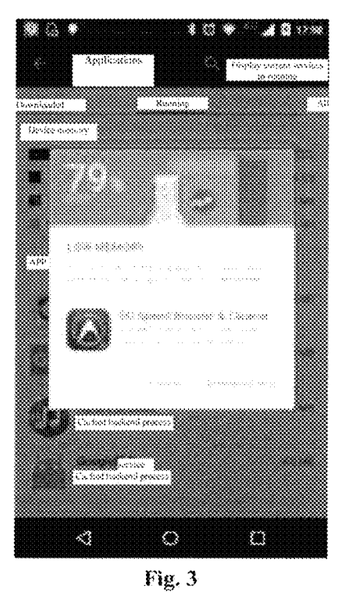
FIG. 3 is a schematic diagram of an example of a message pushing method according to a first embodiment of the present invention.
Figure 4:
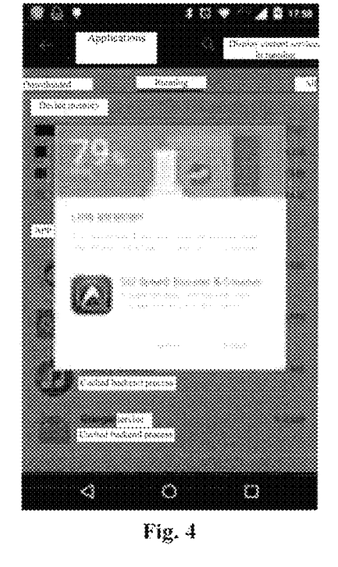
FIG. 4 is another schematic diagram of an example of a message pushing method according to a first embodiment of the present invention.
Figure 5:
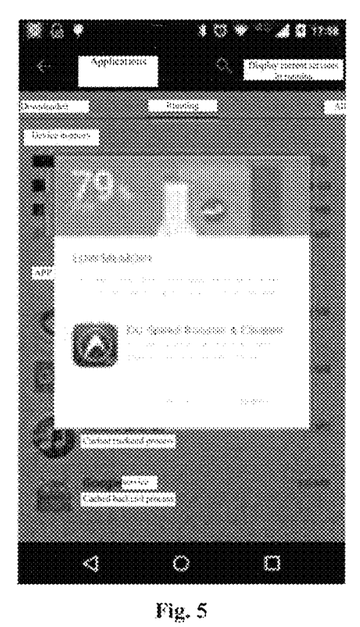
FIG. 5 is another schematic diagram of an example of a message pushing method according to a first embodiment of the present invention.
Figure 6:
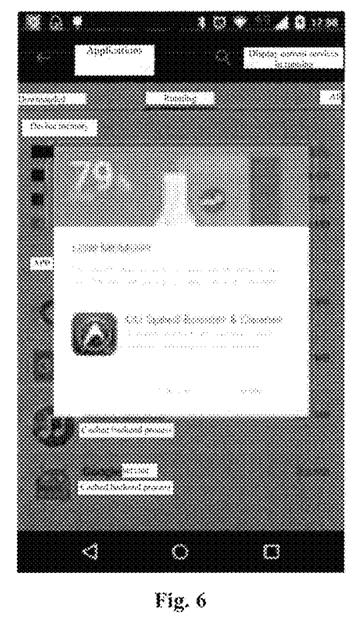
FIG. 6 is another schematic diagram of an example of a message pushing method according to a first embodiment of the present invention.

For example, a target message is used to recommend a cleaning application, and a corresponding pushing trigger condition is that "the RAM utilization rate of a local device is greater than or equal to 75% and the network type is WIFI" or "the remaining storage capacity of a local device is lower than or equal to 20% and the network type is WIFI". When it is monitored that a client is in a WIFI connection status and the RAM utilization rate of the local device is 75% (greater than or equal to 75%), a message display interface that fits the local application environment is generated for pushing according to the target message:

when the local application environment is that the cleaning application has not been installed and has not been downloaded, the message display interface is shown in FIG. 3, which provides a "Download Now" button (corresponding to a download operation) and a "Cancel" button (corresponding to closing the message display interface) for a user to select to download the cleaning application: clicking "Download Now" to download and clicking "Cancel" to ignore;

when the local application environment is that the cleaning application has not been installed but has been downloaded, the message display interface is shown in FIG. 4, which provides an "Install" button (corresponding to an install operation) and a "cancel" button (corresponding to closing the message display interface) for a user to select to install the cleaning application: clicking "Install" to install and clicking "Cancel" to ignore;

when the local application environment is that the version of the installed cleaning application is not the latest version, the message display interface is shown in FIG. 5, which provides an "Update" button (corresponding to an upgrade operation) and a "cancel" button (corresponding to closing the message display interface) for a user to select to upgrade the cleaning application: clicking "Update" to upgrade and clicking "Cancel" to ignore;

when the local application environment is that the latest version of the cleaning application has been installed, the message display interface is shown in FIG. 6, which provides an "Open" button (corresponding to an open operation) and a "cancel" button (corresponding to cancelling the operation) for a user to select to open the cleaning application: clicking "Open" to open and clicking "Cancel" to ignore.

As another example, a target message is used to recommend a power saving application, and a corresponding pushing trigger condition is that the remaining power of a local device is lower than 30%. When it is monitored that the remaining power of the local device is lower than 30%, a message display interface that fits the local application environment is generated for pushing according to the target message, which is correspondingly similar to what is shown in FIG. 3 to FIG. 6 and will not be repeated herein.

Figure 7:
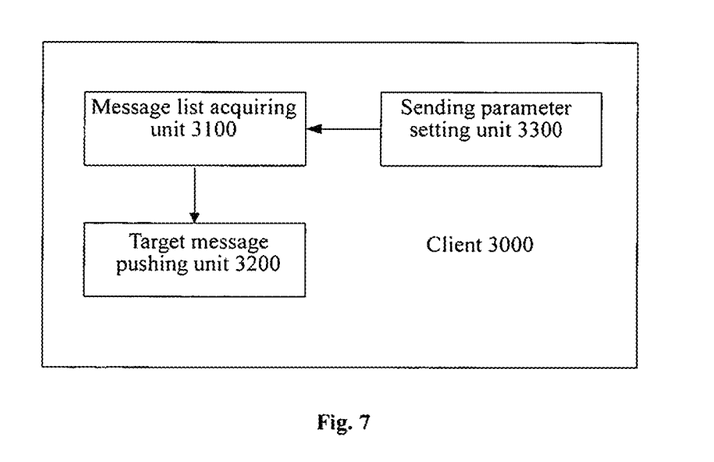
FIG. 7 is a schematic block diagram of a client in a first embodiment of the present invention.

In the present embodiment, a client 3000 is further provided, which comprises, as shown in FIG. 7, a message list acquiring unit 3100, a target message pushing unit 3200, and optionally further comprises a sending parameter setting unit 3300. They are configured to implement any message pushing method according to the present embodiments, which will not be repeated herein.

The client 3000 comprises:

the message list acquiring unit 3100 configured to send a message list request to a server and acquire a target message list correspondingly returned by the server, wherein the message list request at least comprises request source information, the target message list comprises at least one target message to be pushed and a corresponding message pushing trigger condition, and the message pushing trigger condition is a corresponding local status index when the target message is triggered for pushing;

the target message pushing unit 3200 configured to generate, when it is monitored that the local status meets a pushing trigger condition for the target message and according to the target message, a message display interface that fits the local application environment for pushing the target message.

Optionally, the target message is used to recommend a corresponding target application, the local application environment comprises that the target application has not been downloaded, that the target application has been downloaded but not installed, that the version of the installed target application is not the latest version, and that the latest version of the target application has been installed, and the target message pushing unit 3200 is further configured to:

when the local application environment is that the target application has not been installed and has not been downloaded, generate the message display interface for a user to select to download the target application;

when the local application environment is that the target application has not been installed but has been downloaded, generate the message display interface for a user to select to install the target application;

when the local application environment is that the version of the installed target application is not the latest version, generate the message display interface for a user to select to upgrade the target application;

when the local application environment is that the latest version of the target application has been installed, generate the message display interface for a user to select to open the target application.

Optionally, the client 3000 further comprises the sending parameter setting unit 3300 configured to trigger, in response to a sending parameter setting request and according to the set sending parameter, the message list acquiring unit 3100 to work.

In the present embodiment, the implementation form of a physical device of the client 3000 is not limited. The client 3000 may be an independent physical device, such as a cell phone, a handheld computer, a tablet computer, a laptop computer, or a desktop computer, or may be a functional unit arranged in a corresponding physical device, or may be an application program installed on a corresponding physical device or operating system, which will not be listed one by one.

In the present embodiment, a programmable device is further provided, which comprises a memory and a processor, the memory is configured to store an instruction, and the instruction is used to control the processor to operate to execute any message pushing method according to the present embodiment. Specifically, the hardware configuration of the programmable device may be the client 1200 shown in FIG. 1.

The first embodiment of the present invention has been described above with reference to the accompanying drawings. In the present embodiment, after a corresponding target message list is acquired by sending a message list request to a server, and when it is monitored that the local status meets a pushing trigger condition for a target message comprised in the target message list, a message display interface that fits the local application environment is generated according to the target message for pushing, which realizes message pushing according to an actual application scenario of a pushing object, such that the timing to push messages is more accurate and at the same time, messages are pushed via a message display interface that fits the local application environment, thereby improving the message display efficiency.

Those skilled in the art should understand that the client 3000 may be implemented in various manners. For example, the client 3000 may be implemented by configuring a processor with an instruction. For example, an instruction may be stored in ROM, and when a device is activated, the instruction is read from ROM to a programmable device to implement the client 3000. For example, the client 3000 may be fixed into a dedicated device (e.g. ASIC). The client 3000 may be divided into mutually independent units, or they may be combined for implementation. The client 3000 may be implemented in any one of the above various implementation manners, or may be implemented through a combination of two or more of the above various implementation manners.

Second Embodiment

Figure 8:
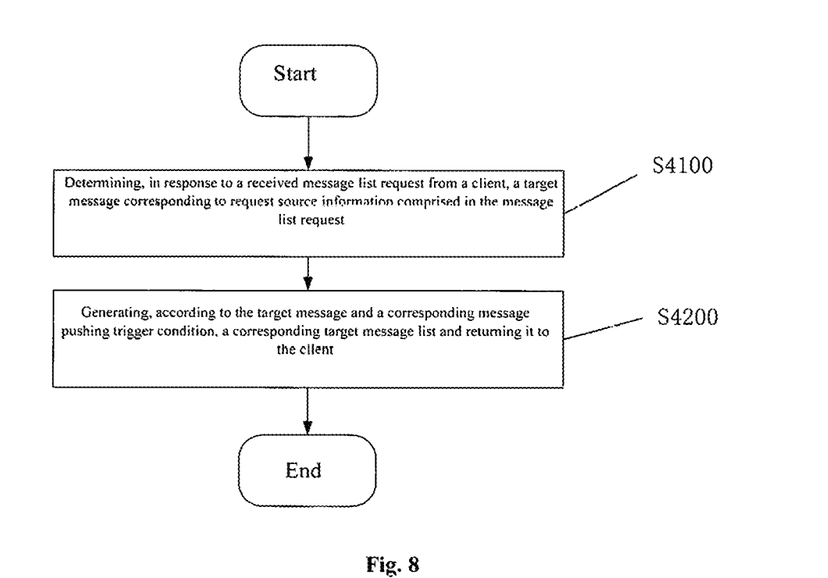
FIG. 8 is a flow chart of a message pushing method according to a second embodiment of the present invention.

A message pushing method is provided in the second embodiment of the present invention, as shown in FIG. 8, comprising:

Step S4100. Determining, in response to a received message list request from a client, a target message corresponding to request source information comprised in the message list request.

In the present embodiment, the message list request from a client at least comprises request source information. The request source information is the source information of the client that sends the message list request, e.g. source country, source channel, a version of the client and other information. The client may be an electronic device, such as a cell phone, a handheld computer, a tablet computer, etc., or may be an application program having some application functions and installed in an electronic device.

A target message corresponding to the request source information is determined according to the request source information, and the target message can be preset according to an application scenario or an application need.

For example, there is an application need to push a target message to recommend a power saving application to target pushing objects that are clients of all countries, all channels and all versions. The pushing trigger condition for the target message is that the remaining power of a local device of a client is lower than 30%. Through an interface input operation or by sending a setting request, therefore, a target message to recommend a power saving application corresponding to the request source information being all countries, all channels and all versions can be preset, and a corresponding message pushing condition is set to be that the remaining power of a local device of a client is lower than 30%.

As another example, there is a need to push a target message to recommend a cleaning application. In a predetermined application scenario, the target pushing objects are clients of "China", "Channel 1", and "Version 2.0". The pushing trigger condition for the target message is that "the RAM utilization rate of a local device is greater than or equal to 75% and the network type is WIFI" or "the remaining storage capacity of a local device is lower than or equal to 20% and the network type is WIFI". Through an interface input operation or by sending a setting request, therefore, a target message to recommend a cleaning application corresponding to the request source information being "China", "Channel 1", and "Version 2.0" can be preset, and a corresponding message pushing condition is set to be that "the RAM utilization rate of a local device is greater than or equal to 75% and the network type is WIFI" or "the remaining storage capacity of a local device is lower than or equal to 20% and the network type is WIFI".

Specifically, the message pushing method provided in the present embodiment may therefore further comprise: in response to a message pushing setting request, setting the target message to be pushed and the corresponding message pushing trigger condition.

In the present embodiment, the message pushing setting request may be further used to set, according to an application need, whether to respond to a received message list request from a client.

After the target message is determined through the step S4100, at Step S4200, generating, according to the target message and a corresponding message pushing trigger condition, a corresponding target message list and returns it to the client, wherein the target message list comprises at least one target message to be pushed and a corresponding message pushing trigger condition, and the message pushing trigger condition is a corresponding local status index of the client when the target message is triggered for pushing.

In the present embodiment, corresponding target information is determined according to request source information in a message list request of a client, a corresponding target message list is generated according to the target information and a message trigger condition to be met by a corresponding local status index of the client when the corresponding target message list is triggered for pushing, and the target message list is returned to the client, such that the target message list can be pushed to clients that comply with the request source information. As a result, the focus can be precisely placed on pushing objects, and a client can push a target message when monitoring that the local status meets a message trigger condition, which realizes message pushing according to an actual application scenario of a pushing object, such that the timing to push messages is more accurate and the message pushing efficiency is improved.

Figure 9:
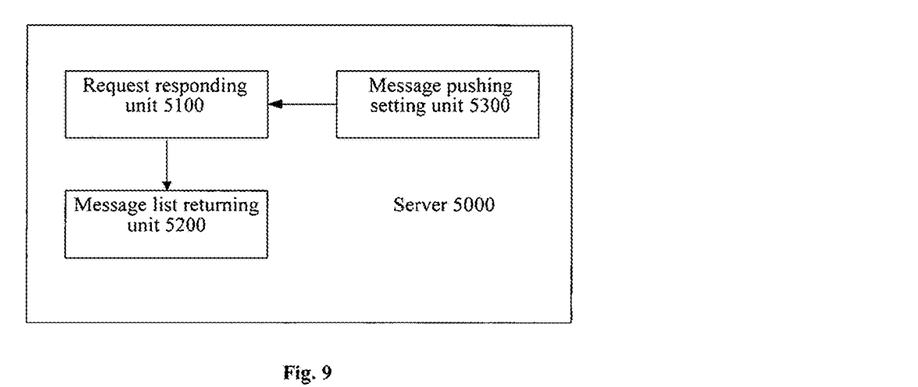
FIG. 9 is a schematic block diagram of a server in a second embodiment of the present invention.

In the present embodiment, a server 5000 is further provided, which comprises, as shown in FIG. 9, a request responding unit 5100, a message list returning unit 5200, and optionally further comprises a message pushing setting unit 5300. They are configured to implement any message pushing method according to the present embodiments, which will not be repeated herein.

The server 5000 comprises:

the request responding unit 5100 configured to determine, in response to a received message list request from a client, a target message corresponding to request source information comprised in the message list request;

the message list returning unit 5200 configured to generate, according to the target message and a corresponding message pushing trigger condition, a corresponding target message list and return it to the client, wherein the target message list comprises at least one target message to be pushed and a corresponding message pushing trigger condition, and the message pushing trigger condition is a corresponding local status index of the client when the target message is triggered for pushing.

Optionally, the server 5000 further comprises the message pushing setting unit 5300 configured to set, in response to a message pushing setting request, the target message to be pushed and the corresponding message pushing trigger condition.

In the present embodiment, the implementation form of a physical device of the server 5000 is not limited. The server 5000 may be an independent physical device, such as a server device, or may be a functional unit arranged in a corresponding physical device, or may be an application program installed on a corresponding physical device or operating system, which will not be listed one by one.

In the present embodiment, a programmable device is further provided, which comprises a memory and a processor, the memory is configured to store an instruction, and the instruction is used to control the processor to operate to execute any message pushing method according to the present embodiment. Specifically, the hardware configuration of the programmable device may be the server 1100 shown in FIG. 1.

Example

Figure 10:
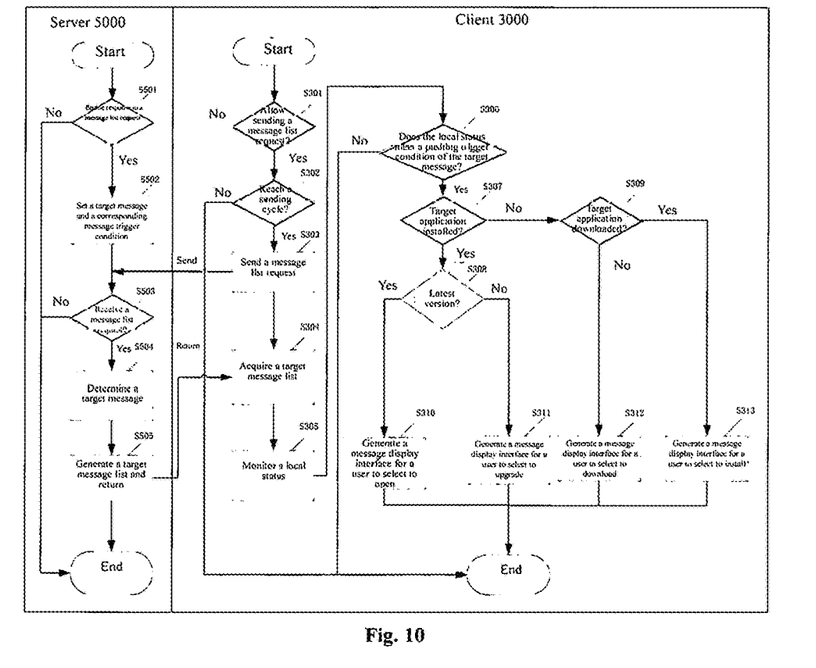
FIG. 10 is a schematic flow chart of an example of a message pushing method according to the present invention.

The message pushing method according to the present invention will be further described below through an example with reference to FIG. 10. As shown in FIG. 10, the message pushing method in the present example is implemented by the client 3000 according to the first embodiment and the server 5000 according to the second embodiment. The method comprises steps S301-S313 implemented by the client 3000 and steps S501-S505 implemented by the server 5000.

At the side of the server 5000:

Step S501. Judge whether enabling a response to a message list request is set; if enabled, go to Step S502; otherwise, end;

Step S502. In response to a message pushing setting request, set a target message and a corresponding message pushing trigger condition; in the present example, set corresponding target pushing objects to be clients of "China", "Channel 1", and "Version 2.0"; the target message is used to recommend a cleaning application; moreover, set a corresponding message pushing condition to be that "the RAM utilization rate of a local device is greater than or equal to 75% and the network type is WIFI" or "the remaining storage capacity of a local device is lower than or equal to 20% and the network type is WIFI"; go to Step S503;

Step S503. Judge whether a message list request is received; if receiving a message list request sent by the corresponding client 3000 by executing the step S303, go to Step S504; otherwise, end;

Step S504. Determine a target message corresponding to request source information comprised in the message list request; in the present example, the request source information is "China", "Channel 1", and "Version 2.0", and the corresponding target message is used to recommend a cleaning application; go to Step S505;

Step S505. Generate, according to the target message and a corresponding message pushing trigger condition, a target message list and return it to the client 3000; in the present example, the request source information is "China", "Channel 1", and "Version 2.0", and the corresponding target message is used to recommend a cleaning application; go to Step S505; the target message list comprises the target message used to recommend a cleaning application and a corresponding message pushing trigger condition, "the RAM utilization rate of a local device is greater than or equal to 75% and the network type is WIFI" or "the remaining storage capacity of a local device is lower than or equal to 20% and the network type is WIFI"; return the target message list to the client, and end.

At the side of the client 3000:

Step S301. Judge whether it is set to allow sending a message list request; if allowed, go to Step S302; otherwise, end;

Step S302. Judge whether a sending cycle set by a sending parameter setting request has been reached; in the present example, the sending cycle is 24 h; if the sending cycle is reached, go to Step S303; otherwise, end;

Step S304. Receive a target information list returned by the server 5000 by executing the step S505; in the present example, the target information list comprises target information for recommending a cleaning application and a corresponding message pushing condition, "the RAM utilization rate of a local device is greater than or equal to 75% and the network type is WIFI" or "the remaining storage capacity of a local device is lower than or equal to 20% and the network type is WIFI"; go to Step S305;

Step S305. Monitor the local status of the client 3000; in the present example, the local status comprises the RAM utilization rate of the local device and the network type; go to Step S306;

Step S306. Judge whether the local status meets a message pushing trigger condition of the target message; in the present example, the message pushing trigger condition is "the RAM utilization rate of a local device is greater than or equal to 75% and the network type is WIFI" or "the remaining storage capacity of a local device is lower than or equal to 20% and the network type is WIFI"; in the present example, assuming that it is monitored that the RAM utilization rate of a local device is 79% and the local device is in a WIFI connection status, the message pushing trigger condition is met, and go to Step S307; otherwise, if the message pushing trigger condition is not met, end;

Step S307. Judge whether a target application has been installed in the local application environment; if installed, go to Step S308; otherwise, go to Step S309;

Step S308. Judge whether the installed target application is of the latest version; if yes, go to Step S310; otherwise, go to Step S311;

Step S309. Judge whether the target application has been downloaded; if yes, go to Step S313; otherwise, go to Step S312;

Step S310. The local application environment is that the latest version of the target application has been installed, generate the message display interface for a user to select to open the cleaning application, as shown in FIG. 6; when the user selects and executes a corresponding operation, end;

Step S311. The local application environment is that the version of the installed target application is not the latest version, generate the message display interface for a user to select to upgrade the cleaning application, as shown in FIG. 5; when the user selects and executes a corresponding operation, end;

Step S312. The local application environment is that the target application has not been installed and has not been downloaded, generate the message display interface for a user to select to download the cleaning application, as shown in FIG. 3; when the user selects and executes a corresponding operation, end;

Step S313. The local application environment is that the target application has not been installed but has been downloaded, generate the message display interface for a user to select to install the cleaning application, as shown in FIG. 4; when the user selects and executes a corresponding operation, end.

The second embodiment of the present invention has been described above with reference to the accompanying drawings and examples. In the present embodiment, corresponding target information is determined according to request source information in a message list request of a client, a corresponding target message list is generated according to the target information and a message trigger condition to be met by a corresponding local status index of the client when the corresponding target message list is triggered for pushing, and the target message list is returned to the client, such that the target message can be pushed to clients that comply with the request source information. As a result, the focus can be precisely placed on pushing objects, and a client can push a target message when monitoring that the local status meets a message trigger condition, which realizes message pushing according to an actual application scenario of a pushing object, such that the timing to push messages is more accurate and the message pushing efficiency is improved.

Those skilled in the art should understand that the server 5000 may be implemented in various manners. For example, the server 5000 may be implemented by configuring a processor with an instruction. For example, an instruction may be stored in ROM, and when a device is activated, the instruction is read from ROM to a programmable device to implement the server 5000. For example, the server 5000 may be fixed into a dedicated device (e.g. ASIC). The server 5000 may be divided into mutually independent units, or they may be combined for implementation. The server 5000 may be implemented in one of the above various implementation manners, or may be implemented through a combination of two or more of the above various implementation manners.

It is known to those skilled in the art that, given the development of electronic information technologies, such as Large Scale Integrated Circuit technologies, and the trend that software is increasingly implemented in the form of hardware, it is already more difficult to clearly draw a line between software and hardware of a computer system. That is because any operation can be implemented by either software or hardware. The execution of any instruction can be carried out by either hardware or software. Whether a hardware implementation solution or a software implementation solution is adopted for a machine function is dependent on non-technical factors, such as price, speed, reliability, storage capacity, and update cycle. To those skilled in the field of electronic information technologies, therefore, a manner to more directly and clearly describe a technical solution is to describe each operation in the solution. When being aware of operations to be executed, those skilled in the art can directly design a desired product on the basis of considerations of the non-technical factors.

The present invention may be a system, a method, and/or a computer program product. The computer program product may comprise a computer readable storage medium, which carries computer readable program instructions that cause a processor to implement all aspects of the present invention.

The computer readable storage medium may be a tangible device capable of maintaining and storing instructions that are used by instruction execution devices. For example, the computer readable storage medium may be, but is not limited to, an electric storage device, a magnetic storage device, an optical storage device, an electromagnetic storage device, a semiconductor storage device, or any proper combination of the above. A more specific example (not an exhaustive list) of the computer readable storage medium includes: a portable computer disk, a hard drive, a Random-Access Memory (RAM), a Read-Only Memory (ROM), an Erasable Programmable Read-Only Memory (EPROM or flash drive), a Static RAM (SRAM), a Compact Disk Read-Only Memory (CD-ROM), a Digital Versatile Disc (DVD), a memory stick, a floppy disk, a mechanical encoding device, a punch card or a bump structure inside a groove that, for example, stores instructions thereon, and any proper combination of the above. The computer readable storage medium used herein cannot be construed to be transient signals themselves, such as radio waves or other freely propagated electromagnetic waves, electromagnetic waves propagated through a waveguide or other transmission media (e.g. an optical pulse passing through a fiber optic cable), or electric signals transmitted through an electric wire.

The computer readable program instructions described herein may be downloaded from a computer readable storage medium to each computing/processing device, or downloaded to an external computer or an external storage device via a network, such as the Internet, a local area network, a wide area network, and/or a wireless network. The network may comprise copper transmission cables, fiber optic transmission, wireless transmission, routers, firewalls, switches, gateway computers, and/or edge servers. A network adapter or network port in each computing/processing device receives computer readable program instructions from the network, and forwards the computer readable program instructions for storage in a computer readable storage medium in each computing/processing device.

The computer readable program instructions for executing operations of the present invention may be assembly language instructions, instruction set architecture (ISA) instructions, machine instructions, machine-related instructions, microcode, firmware instructions, status setting data, or source codes or target codes compiled in any combination of one or more programming languages. The programming languages include object oriented programming languages, such as Smalltalk, C++, etc., and conventional procedural programming languages, such as C or similar programming languages. The computer readable program instructions can be executed fully on a user computer, executed partially on a user computer, executed as an independent software package, executed partially on a user computer and partially on a remote computer, or executed fully on a remote computer or a server. In a circumstance in which a remote computer is involved, the remote computer may be connected to a user computer via any type of network, including a local area network (LAN) or a wide area network (WAN), or the remote computer may be connected to an external computer (e.g. by using an Internet service provider to connect via the Internet). In some embodiments, an electronic circuit, such as a programmable logic circuit, a field programmable gate array (FPGA), or a programmable logic array (PLA), is customized by using status information of computer readable program instructions. The electronic circuit can execute the computer readable program instructions to realize all aspects of the present invention.

All aspects of the present invention are described with reference to flowcharts and/or block diagrams of the method, device (system) and computer program product according to the embodiments of the present invention. It should be understood that each block in the flowcharts and/or block diagrams and combinations of the blocks in the flowcharts and/or block diagrams can be implemented by computer readable program instructions.

These computer readable program instructions may be provided to a processor of a general-purpose computer, a dedicated-purpose computer, or other programmable data processing devices, so as to produce a machine, such that these instructions, when executed by the processor of a computer or other programmable data processing devices, produce a device to implement functions/actions prescribed in one or more blocks in the flowcharts and/or block diagrams. Alternatively, these computer readable program instructions may also be stored in a computer readable storage medium. These instructions instruct a computer, a programmable data processing device, and/or other devices to work in a particular manner, such that the computer readable storage medium stored with the instructions comprises a manufactured article that includes instructions to implements all aspects of functions/actions prescribed in one or more blocks in the flowcharts and/or block diagrams.

These computer readable program instructions may also be loaded to a computer, other programmable data processing devices, or other devices, such that a series of operational steps are performed on the computer, other programmable devices, or other devices, thereby generating a process of computer implementation. As a result, the instructions executed on the computer, other programmable data processing devices, or other devices implement functions/actions prescribed in one or more blocks in the flowcharts and/or block diagrams.

The flowcharts and block diagrams in the accompanying drawings have illustrated architectures, functions and operations that may be implemented by the system, method and computer program products according to a plurality of embodiments of the present invention. In this regard, each block in the flowcharts or block diagrams may represent a part of a module, a program segment or an instruction, and the part of the module, program segment or instruction comprises one or more executable instructions for implementing prescribed logic functions. In some alternative implementations, functions marked in the blocks may also take place in an order different from the one marked in the accompanying drawings. For example, two consecutive blocks can actually be executed substantially in parallel, and they may sometimes be executed in a reverse order, which depends on involved functions. It should also be noted that each block in the flowcharts and/or block diagrams and combinations of the blocks in the flowcharts and/or block diagrams may be implemented by a dedicated and hardware-based system for executing prescribed functions or actions, or may be implemented by a combination of dedicated hardware and computer instructions. It is known to those skilled in the art that an implementation by means of hardware, an implementation by means of software, and an implementation by means of a combination of software and hardware are all equivalent to each other.

The embodiments of the present invention are described above, and the description above is illustrative, rather than exhaustive. Moreover, the description above is not limited to the disclosed embodiments. Without departing from the scope and spirit of the described embodiments, many modification and variations are obvious to those skilled in the art. The terms used herein are selected with an intention to explain, in the best way, the principles and actual applications of the embodiments or improvements to the technologies on the market, or to enable others skilled in the art to understand the embodiments of the present invention. The scope of the present invention shall be subject to the appended claims.

What is claimed is:
1. A message pushing method, comprising:
sending a message list request to a server, and acquiring a target message list correspondingly returned by the server,
wherein the message list request comprises request source information, the target message list comprises at least one target message to be pushed and a message pushing trigger condition, and the message pushing trigger condition includes a local status index indicating when pushing of the target message is triggered; and
generating a message display interface corresponding to a local application environment of a client device and including the target message, when a local status of the client device is monitored as meeting the message pushing trigger condition.

2. The method according to claim 1, wherein the target message is used to recommend a target application, the local application environment comprises that the target application has not been downloaded, that the target application has been downloaded but not installed, that the version of the installed target application is not the latest version, and that the latest version of the target application has been installed, and the step of generating a message display interface that fits the local application environment of the client device and includes the target message comprises:
when the local application environment is that the target application has not been installed and has not been downloaded, generating a first message display interface for a user to select to download the target application;
when the local application environment is that the target application has not been installed but has been downloaded, generating a second message display interface for the user to select to install the target application;
when the local application environment is that the version of the installed target application is not the latest version, generating a third message display interface for the user to select to upgrade the target application; and
when the local application environment is that the latest version of the target application has been installed, generating a fourth message display interface for the user to select to open the target application.

3. The method according to claim 1, wherein the step of sending the message list request is carried out in response to a sending parameter setting request and according to a set sending parameter.

4. The method according to claim 3, wherein the sending parameter comprises a sending cycle of the message list request.

5. The method according to claim 1, wherein the local status index comprises one of local device status indexes and local application environment indexes.

6. The method according to claim 5, wherein the local device status indexes include a status index of at least one status of the client device, including at least one of remaining power, storage capacity, CPU, utilization rate, CPU temperature, RAM utilization rate, number of installed applications, local time period, network connection type, charging status, and foreground process.

7. The method according to claim 5, wherein the local application environment indexes include an local application environment corresponding to content of the target message.

8. A message pushing method, comprising:
in response to a message list request received from a client, determining a target message corresponding to request source information comprised in the message list request; and
generating a target message list and returning the generated target message list to the client, wherein the target message list comprises at least one target message to be pushed and a message pushing trigger condition, and the message pushing trigger condition includes a local status index of the client indicating when the target message is triggered to be pushed.

9. The method according to claim 8, further comprising:
in response to a message pushing setting request, setting the target message to be pushed and the message pushing trigger condition.

10. A client device, comprising:
one or more processors; and
a memory storing instructions, when executed by the one or more processors, configured to cause the one or more processors to perform an operation comprising:
sending a message list request to a server and acquire a target message list correspondingly returned by the server, wherein the message list request comprises request source information, the target message list comprises at least one target message to be pushed and a message pushing trigger condition, and the message pushing trigger condition includes a corresponding local status index indicating when pushing of the target message is triggered; and
generating, when a local status of the client device is monitored as meeting the pushing trigger condition, a message display interface corresponding to a local application environment of the client device and including the target message.

11. The client device according to claim 10, wherein the target message is used to recommend a target application, the local application environment comprises that the target application has not been downloaded, that the target application has been downloaded but not installed, that the version of the installed target application is not the latest version, and that the latest version of the target application has been installed, and the operation further comprises:
generating, when the local application environment is that the target application has not been installed and has not been downloaded, a first message display interface for a user to select to download the target application;
generating, when the local application environment is that the target application has not been installed but has been downloaded, a second message display interface for the user to select to install the target application;
generating, when the local application environment is that the version of the installed target application is not the latest version, a third message display interface for the user to select to upgrade the target application; and
generating, when the local application environment is that the latest version of the target application has been installed, a fourth message display interface for the user to select to open the target application.

12. The client device according to claim 10, wherein the local status index at least comprises one of local device status indexes and local application environment indexes.

13. The client device according to claim 12, wherein the local device status indexes include a status index of at least one status of the client device, including at least one of remaining power, storage capacity, CPU, utilization rate, CPU temperature, RAM utilization rate, number of installed applications, local time period, network connection type, charging status, and foreground process.

14. The client device according to claim 12, wherein the local application environment indexes include an local application environment corresponding to content of the target message.

15. The client device according to claim 10, wherein the operation further comprise
receiving a sending parameter setting request, wherein the message list request is sent in response to the sending parameter setting request and according to a set sending parameter.

16. The client device according to claim 15, wherein the sending parameter comprises a sending cycle of the message list request.

17. A server, comprising:
one or more processors; and
a memory storing instruction, when executed by the one or more processors, configured to cause the one or more processors to perform a method comprising:
determining, in response to a message list request received from a client, a target message corresponding to request source information comprised in the message list request; and
generating a target message list and returning the target message list to the client, wherein the target message list comprises at least one target message to be pushed and a message pushing trigger condition, and the message pushing trigger condition includes a corresponding local status index of the client indicating when pushing of the target message is triggered.

18. The server according to claim 17, wherein the operation further comprises:
setting, in response to a message pushing setting request, the target message to be pushed and the message pushing trigger condition.

* * * * *